US009132361B2

(12) United States Patent
Smithwick

(10) Patent No.: US 9,132,361 B2
(45) Date of Patent: Sep. 15, 2015

(54) PROJECTABLE MASKS

(71) Applicant: DISNEY ENTERPRISES, INC., Burbank, CA (US)

(72) Inventor: Quinn Y. Smithwick, Pasadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 296 days.

(21) Appl. No.: 13/889,077

(22) Filed: May 7, 2013

(65) Prior Publication Data

US 2014/0333899 A1 Nov. 13, 2014

(51) Int. Cl.
G03B 21/00 (2006.01)
A63J 5/02 (2006.01)
G02B 27/22 (2006.01)
G02B 21/00 (2006.01)
G02B 26/00 (2006.01)
G02B 5/23 (2006.01)

(52) U.S. Cl.
CPC ............... A63J 5/021 (2013.01); G02B 21/00 (2013.01); G02B 27/2292 (2013.01); G02B 5/23 (2013.01); G02B 26/005 (2013.01)

(58) Field of Classification Search
CPC .... G02B 27/2292; G02B 26/005; G02B 5/23; A63J 5/021; G03B 21/00
USPC .......................................................... 353/10
See application file for complete search history.

(56) References Cited

U.S. PATENT DOCUMENTS

| 3,706,487 | A | 12/1972 | LaForgia |
| 3,807,849 | A | 4/1974 | Lobb |
| 5,589,852 | A | 12/1996 | Thompson |
| 6,229,562 | B1 | 5/2001 | Kremen |
| 6,273,567 | B1 | 8/2001 | Conner |
| 6,481,851 | B1 * | 11/2002 | McNelley et al. ............... 353/28 |
| 6,906,836 | B2 | 6/2005 | Parker |
| 7,310,080 | B2 | 12/2007 | Jessop |
| 7,564,612 | B2 | 7/2009 | Chui |
| RE41,062 | E | 12/2009 | Yaniv |
| 7,914,154 | B2 | 3/2011 | Obi et al. |
| 2003/0095081 | A1 | 5/2003 | Furness, III |
| 2007/0054594 | A1 | 3/2007 | Schmidt |
| 2007/0206280 | A1 | 9/2007 | May |

(Continued)

FOREIGN PATENT DOCUMENTS

WO 8809952 12/1988

Primary Examiner — Sultan Chowdhury
Assistant Examiner — Danell L Owens
(74) Attorney, Agent, or Firm — Marsh Fischmann & Breyfogle LLP; Kent A. Lembke

(57) ABSTRACT

A display assembly for displaying a virtual image of an object with occlusion and contrast. The display assembly includes a virtual object display selectively displaying an image at a virtual object plane. The display assembly includes a mask generation screen assembly with a screen element operable in a first state in which the screen element is transparent to visible light and in a second state in which a portion is opaque. The screen element is positioned proximate to the virtual object plane. The opaque portion of the screen element corresponds in size, shape, and location to the displayed virtual object image to provide a mask for the virtual image. The screen element may include a projectable mask screen opaque in regions exposed to a predefined type of non-visible light. The non-visible light may be ultraviolet (UV) light or infrared (IR) light selectively provided by a UV or IR projector.

20 Claims, 7 Drawing Sheets

(56) References Cited

U.S. PATENT DOCUMENTS

| | | |
|---|---|---|
| 2009/0232509 A1 | 9/2009 | Heikenfeld |
| 2010/0027083 A1 | 2/2010 | Kroll |
| 2010/0188443 A1 | 7/2010 | Lewis |
| 2010/0321478 A1 | 12/2010 | Sliwa |
| 2011/0090560 A1 | 4/2011 | Okamoto |
| 2011/0133672 A1 | 6/2011 | Tsang |
| 2011/0188116 A1 | 8/2011 | Ledentsov |
| 2011/0212751 A1 | 9/2011 | Havens |

* cited by examiner

NARROW WAVELENGTH
RED+GREEN+BLUE

PROJECTABLE MASKS

BACKGROUND

1. Field of the Description

The present invention relates, in general, to displays providing a three dimensional (3D) effect without use of special glasses such as, but not limited to, a Pepper's Ghost display, and, more particularly, to displays (or display assemblies) and display methods that utilize a dynamic (on/off, movable in location, and/or variable in size) mask to enhance a displayed (e.g., projected) virtual image such as the image of a character or object selectively positioned within a real life set or set with physical objects and/or characters as in the case of many Pepper's Ghost displays.

2. Relevant Background

There are numerous settings where it is desirable to create a unique visual display. For example, theme or amusement parks may include rides or walk-through attractions where guests (or "viewers") are entertained by a unique visual effect or illusion. Pepper's Ghost is an illusionary technique used by magicians, by ride or attraction designers, and others to produce a 3D illusion of a latent or ghost-like image. Using a simple piece of plate glass and special lighting techniques, Pepper's Ghost systems can make objects appear and disappear within a scene or room.

Generally, these systems include a main room or scene that is readily viewed by a guest or viewer and a hidden room that is not visible to the viewer. Both rooms are typically identical in their physical structure including furniture and other objects except that the hidden room may include additional objects or characters such as a ghost or other character. A large piece of glass or a half-silvered mirror is situated between the viewer and the scene at an angle, such as at about 45 degrees. When the main room is lit and the hidden room is darkened, the viewer only sees the main room as the hidden room does not reflect from the glass. The sheet of glass is itself hard to see as it typically is quite large so that it extends across the entire view of the main room.

Pepper's Ghost (e.g., the character in the hidden room) then becomes very visible to the viewer when the entire hidden room or portions such as the ghost or other character are brightly lit. Since only a portion of the light cast upon the ghost or other objects in the hidden room is reflected from the glass, the reflected images appear as latent or ghostly images relative to the objects in the main room, e.g., the reflected images or images superimposed in the visible room may appear to float. The Pepper's Ghost image is a 3D image that may be a still image or animation may be provided such as with animatronics providing the "ghost" or by placing a live actor in the hidden room. In many systems, a 2D display is used as these displays are more dynamic and controllable and do not require a live actor or expensive animatronics. However, this results in a 2D image or flat object being positioned within a 3D set, e.g., the main room of the Pepper's Ghost display. In a broad sense, the Pepper's Ghost systems may be thought of as implementing autostereoscopy, which is generally a method of displaying 3D images that can be viewed without the use of headgear or glasses on the part of the user.

FIGS. 1A and 1B illustrate a traditional layout for a Pepper's Ghost display assembly 100 for use in creating a 3D display 150 for a viewer 105. The assembly 100 includes a display scene or real world set 110, a background prop 112, and a foreground prop 114. The props 112, 114 are physical objects such as pieces of furniture that a "ghost" may walk among or, as shown for simplicity's sake, a box 112 and a ball 114. A sheet or piece of glass (e.g., a beam splitter) 118 is positioned at an angle (e.g., 45 degrees) between the scene 110 and the expected or planned position of the viewer 105 (or the viewer's point of view (POV)) or an outer display surface/window. The glass 118 is at least partially transparent such that the background prop 112 and the foreground prop 114 are visible through the glass 118 as light 113 travels through the glass 118 to the viewer or viewer's eyes 105 as shown at 115. A display device 120, such as a typical 2D monitor or a hidden room/scene that can be selectively lit, is provided in the display assembly 100 and is used to display an image 124 such as the two-dimensional pyramid shown in FIG. 1A. The foreground prop 114 is in front of the "ghost" in image plane 126 but behind the beam splitter/glass pane 118.

Light 125 travels toward the beam splitter 118 where it is reflected 128 from the front (or viewer-side) of the beam splitter 118 toward the viewer 105. In this manner, a reflection 127 of the displayed image 124 is visible by the viewer 105 concurrently with light transmitted from the props 112, 114, and the reflection 127 may appear to be located (e.g., as a "ghost" or virtual image) between the background prop 112 and the foreground prop 114 through proper spacing of the display surface 122 relative to the front surface of the glass 118 and the locations of the props 112, 114. An additional foreground prop could be provided in front of the glass 118, and such a prop would occlude the "ghost" on plane 126 and background objects such as prop 112.

In the traditional Pepper's Ghost display assembly 100, a partially reflecting pane of glass or beam splitter 118 is used to overlay reflections 127 of a physical object or images 124 from a video or still monitor or display device 120 on a real world scene 110. As shown in FIG. 1B, the reflected object 154 may be positioned between the background prop 152 and the foreground prop 156 from the perspective of the viewer 105, e.g., the virtual character/object plane 126 is between props 112, 114 in scene 110. Unfortunately, the virtual image (or reflection of the virtual or displayed object 124) 154 is semi-transparent (or translucent) and low contrast. This can be seen in FIG. 1B with the background object 152 being visible at 159 through the virtual image 154. Further, the image 154 appears flat or two-dimensional and is incapable of casting its own shadow as would normally be expected of a solid object in scene 110. The 3D effect is also spoiled in part when the reflection 127 is in front of the foreground image 156 as shown at 158. The translucence, lack of shadows, and flat appearance combine to spoil or hinder for a viewer 105 the illusion of a solid, virtual object integrated into the scene 110.

In some more recent Pepper's Ghost display assemblies, a dynamic mask is provided at the virtual character's location within the set (e.g., within the set 110 of assembly 100 at the virtual character plane) behind the beam splitter. The dynamic mask is used to make the virtual character opaque and high contrast. In these assemblies, the dynamic mask is typically produced using a liquid crystal display (LCD) panel without its back light so that the LCD panel can be controlled to be either opaque (when the virtual character or Pepper's ghost is displayed) or transparent (when the virtual character is not being displayed).

An alternative method of creating the virtual character involves projection onto a scrim placed in the set, and the scrim may be formed from an open weave material such that it is semi-transparent and low contrast against a lit background. In yet another alternative method, a transparent self-emissive display (e.g., a transparent OLED) can also be used to create a virtual character in the set. Since the transparent self-emissive display does not block the background light, it is also semi-transparent and low contrast. In both of these alternative methods, a dynamic mask placed behind the virtual character-generating screen (scrim or transparent OLED) may block the background and provide a black level so as to create an opaque and high contrast character.

A challenge for such advanced Pepper's Ghost or scrim-based display assemblies is that the mask area preferably should be able to cover the entire set to provide proper occlusion and other optical effects regardless of the location of the ghost or virtual character/object. Unfortunately, LCD panels are limited in size unless they are tiled and become increasingly expensive with size. For example, an upper limit of size may be about 100-inches diagonal for commercially available LCD panels, and this limits the advanced Pepper's Ghost display or scrim-based assemblies to small sets that may be unacceptable in many settings such as for use in many theme park rides and larger indoor or outdoor displays. A related challenge is that large room sized LCD-based masks of even modest pixel density would have an extremely large number pixels, which need to be rendered, addressed, and updated. A further challenge is how to produce a well lit and easily viewed display. LCD panels highly attenuate the background scene, e.g., more than 70 percent attenuation, even in areas that are not presently being masked. As a result, the background objects behind the LCD panel must be very brightly lit to be readily viewed by a viewer with the virtual character/object and foreground objects (e.g., foreground objects are lit at a lower level of illumination than background objects to be viewed as having similar illumination as expected if in same room/set).

There remains a need for improved visual display techniques and systems such as for creating or projecting/displaying 3D images. Preferably, such a display system or method would provide a high contrast, solid or opaque-appearing, and 3D dimensional virtual character that can be interspersed or located among/between physical props such as physical foreground and background props. Further, in some cases, it may be useful for the display system and method to be adapted such that displayed virtual objects (or images viewable by an observer) are capable of occluding physical objects (e.g., prevent portion 159 of background prop 152 from being viewed by viewer 105 as shown in FIG. 1B), of being occluded by physical objects in front of them or in front of the virtual character plane (e.g., prevent portion 158 of virtual object 154 from being viewed on or in front of foreground prop 156 as shown in FIG. 1B), and of casting true dynamic shadows. Hence, the new display assemblies and methods may be configured to provide effective dynamic masks in an improved manner.

SUMMARY

To address these and other problems with prior 3D displays, a display assembly (and associated method of operation) is provided that includes one or more devices for selectively generating a mask. Particularly, the display assembly includes a dynamic mask generation screen assembly. In some embodiments, the display assembly includes a set with physical objects (that may include live actors or animated objects/characters) and a virtual object or character display device (e.g., a display screen/monitor combined with a beam splitter).

An engineered projection screen and a projector are provided in the mask generation screen assembly. The projection screen may be chosen to turn from transparent to opaque when operated, e.g., selectively projected upon by the projector outputting/projecting a mask with, for example, ultraviolet (UV) or infrared light, at a fast enough rate (e.g., 60 Hz or the like) so that the dynamic mask may match the position and shape of the virtual character. For example, UV or infrared images (with a size and shape associated with a virtual character or object displayed by the virtual character/object display device) are fed to the projector with control signals from a controller. In this manner, the display assembly with its mask generation screen assembly is able to create projectable masks. The projection screen typically is large enough to cover the entire set to provide proper occlusion and other optical effects by extending over the entire area (or nearly so) of the virtual character plane between the viewer and the portion of the set containing the background objects (so not limited in size as was case with LCD display devices in prior Pepper's Ghost displays or scrim-based assemblies).

More particularly, a virtual object display assembly is provided for use with a background set with background objects to display a virtual image of a character or object with proper occlusion and high contrast. The display assembly includes a virtual object display operable to selectively display a virtual object image at a virtual object plane. The display assembly also includes a mask generation screen assembly with a screen element. The mask generation screen assembly is operable in a first state in which the screen element is transparent to visible light and is operable in a second state in which a portion of the screen element is substantially opaque to visible light. In most applications, the screen element is positioned proximate to the virtual object plane (e.g., to coincide with this plane). The opaque portion of the screen element corresponds in size, shape, and location to the displayed virtual object image, whereby the opaque portion provides a dynamic mask for the displayed virtual object image.

In some implementations of the display assembly, the screen element includes a projectable mask screen adapted to be opaque in regions exposed to a predefined type of non-visible light. In such cases, the predefined type of non-visible light may be ultraviolet (UV) light or infrared (IR) light. Then, the mask generation screen assembly may include a UV projector when the predefined type of non-visible light is UV light and may include an IR projector when the predefined type of non-visible light is IR light.

Further, the projectable mask screen may be provided using a fast photochromic screen. Fast photochromic material locally changes from transparent to opaque with the application of UV light, such as within a few milliseconds compared to common photochromic material that may take minutes to make such a change. The material then changes back to transparent within a few milliseconds after the removal of the UV light. A screen made of fast photochromic material would be pixel-free and depend upon the light modulation and pixel resolution of the UV projection. The UV projection may be provided using a high-definition micro-mirror projector with a UV light source and UV compatible optics/lenses (or, alternatively, a UV laser and high speed X-Y scanner) projecting onto only a portion of the screen containing the virtual character. This is performed so as to create a matching mask to a similar color image of the virtual character from monitors reflected in the beam splitter, projected by a visible light projector on the scrim or locally switchable scattering screen, or projected by a UV projector onto a transparent fluorescent screen. The UV projected image and mask may further be moved to another location on the screen using a mirror scanner assembly (with the corresponding visible image being moved by displaying the virtual character on another monitor or using a mirror scanner assembly to project onto a different portion of a scrim, a locally switchable scattering screen, or a transparent fluorescent screen).

In some cases, the virtual object display includes a display screen positioned transverse to the projectable mask screen and operable to display the virtual object image and further includes a beamsplitter disposed at an angle between the display screen and the projectable mask screen. In other cases, though, the virtual object display includes a scrim, an optically addressed self-emissive screen, a locally switchable scattering screen, or a transparent fluorescent screen positioned adjacent and parallel to the projectable mask screen. The scrim screen may be further used with a visible light projector to project a color image of the virtual character onto the screen. The transparent fluorescent screen may further be used with a UV projector selectively projecting the predefined type of non-visible light onto the transparent fluorescent screen to provide the displayed virtual object image.

The locally switchable scattering screen may be similar to the projectable mask in that a screen material (e.g., liquid crystal, pixellated in cells or continuous) may be switched from being transparent to scattering or vice versa through the application of light. The switchable scattering screen may further use a UV (or IR) projector selectively projecting the predefined type of non-visible light to switch the switchable scattering screen from transparent to scattering and a second visible light projector providing the displayed virtual object image. The optically addressed self-emissive screen may be similar to the projectable mask in that a screen is composed of light emitting diodes (e.g., transparent OLEDs or the like) with interdigitated photosensors and may be switched from being transparent to scattering or vice versa through the application of invisible (UV or IR) light (sensed by the photodetector which triggers a voltage to be applied to the corresponding LED).

In some implementations of the display assembly, the screen element of the mask generation screen assembly is pixellated and contains interdigitated or layered (transparent to opaque) switchable elements and photosensors (tuned to detect invisible UV or IR light which may be modulated or encoded). In other cases, the screen element of the mask generation screen assembly includes liquid crystal cells that are switched from opaque to clear based on invisible UV or IR light detected by the corresponding detector (which may detect only modulated or encoded light to increase sensitivity and reject noise or ambient light). In some implementations, the screen element of the mask generation screen assembly includes optically addressed liquid crystal cells.

Further, in some implementations of the display assembly, the screen element of the mask generation screen assembly includes an electrowetting display with optically addressed cells. In such implementations, the optically addressed cells may be operated to be transparent in the first operating state and a subset of the optically addressed cells may be operated to be opaque in the second operating state. In other implementations, the screen element of the mask generation screen assembly includes a tunable mirror device including a plurality of tunable mirror stacks adapted to operate in the first and second operating states to provide a mask for the displayed virtual object image. In these pixellated displays, the image generation device does not need to continuously generate nor store the entire room-sized (e.g., potentially a gigapixel image for a large theater proscenium sized) image, nor have a large electronic addressing matrix scheme to update the entire display. Using optical addressing, each switchable mask pixel is independent, and only the active portions of the screen occupied by the virtual character's color and/or mask images (often small in comparison to the entire display) are stored and updated.

The UV or IR projection may be a high-definition micromirror projector with a UV light source and UV compatible optics/lenses (or, alternatively, a UV laser and a high speed X-Y scanner) projecting onto only a portion of the screen containing the virtual character and creating a matching mask to a similar color image of the virtual character from monitors reflected in the beam splitter, projected by a visible light projector on the scrim or locally switchable scattering screen, or projected by a UV projector onto a transparent fluorescent screen. The UV projected image and mask may further be moved to another location on the screen using a mirror scanner assembly (with the corresponding visible image being moved by displaying the virtual character on another monitor or using a mirror scanner assembly to project onto a different portion of the scrim, the locally switchable scattering screen, or the transparent fluorescent screen).

Although there have been UV projectable (or scanned) photochromic screens, such screens had utilized slow photochromic material to display a monochromic image, and these prior screens were not used as a mask for a separate color image. Similarly, although there have been UV projectable (or scanned) transparent fluorescent screens, such prior screens did not have an integrated (or separate) projectable mask layer. Similarly, although some have suggested a locally selective scattering screen, prior to the inventor no one has suggested having a scattering layer to receive a projected color image with a second projectable mask layer to block the background and provide a black level to produce an opaque and high contrast display.

DETAILED DESCRIPTION

Briefly, it was recognized by the inventor that liquid crystal displays (LCDs) have a number of limitations that make their use in 3D displays undesirable in many settings. LCDs often are relatively small such that the 3D display has to be limited in its size if the LCD display is going to be used to provide a dynamic mask between a background portion of a set and a viewer (i.e., typically, it is desirable to have the mask extend across an entire room-sized or larger background to allow the virtual character that is being masked to be located anywhere within the set/display). Further, with the use of an LCD to generate masks, there is a loss of about half of the light due to polarizers in the LCDs, and more light is lost with color or other filtering, which requires the background to be very brightly lit to be properly viewed by a viewer with the foreground and/or virtual objects.

To address these and other issues, the following description presents 3D display systems or assemblies that include components for providing a dynamic mask in a new manner that allows the mask to be nearly any size and reduces light attenuation or loss. To this end, the 3D display systems include a mask generation screen assembly that is operable by a display controller to selectively generate or display a dynamic mask for a concurrently displayed virtual object. The mask provides proper occlusion of background objects and also provides correct shadowing of foreground light into the background portions of the set or display. A variety of techniques may be used to provide the mask generation screen assembly, and several embodiments of these assemblies are described in the following paragraphs including projectable masks (e.g., a large piece of plastic or glass that is configured to turn from transparent/clear to opaque to selectively provide a mask when ultraviolet (UV) or infrared (IR) light is projected onto it).

Figure 2:
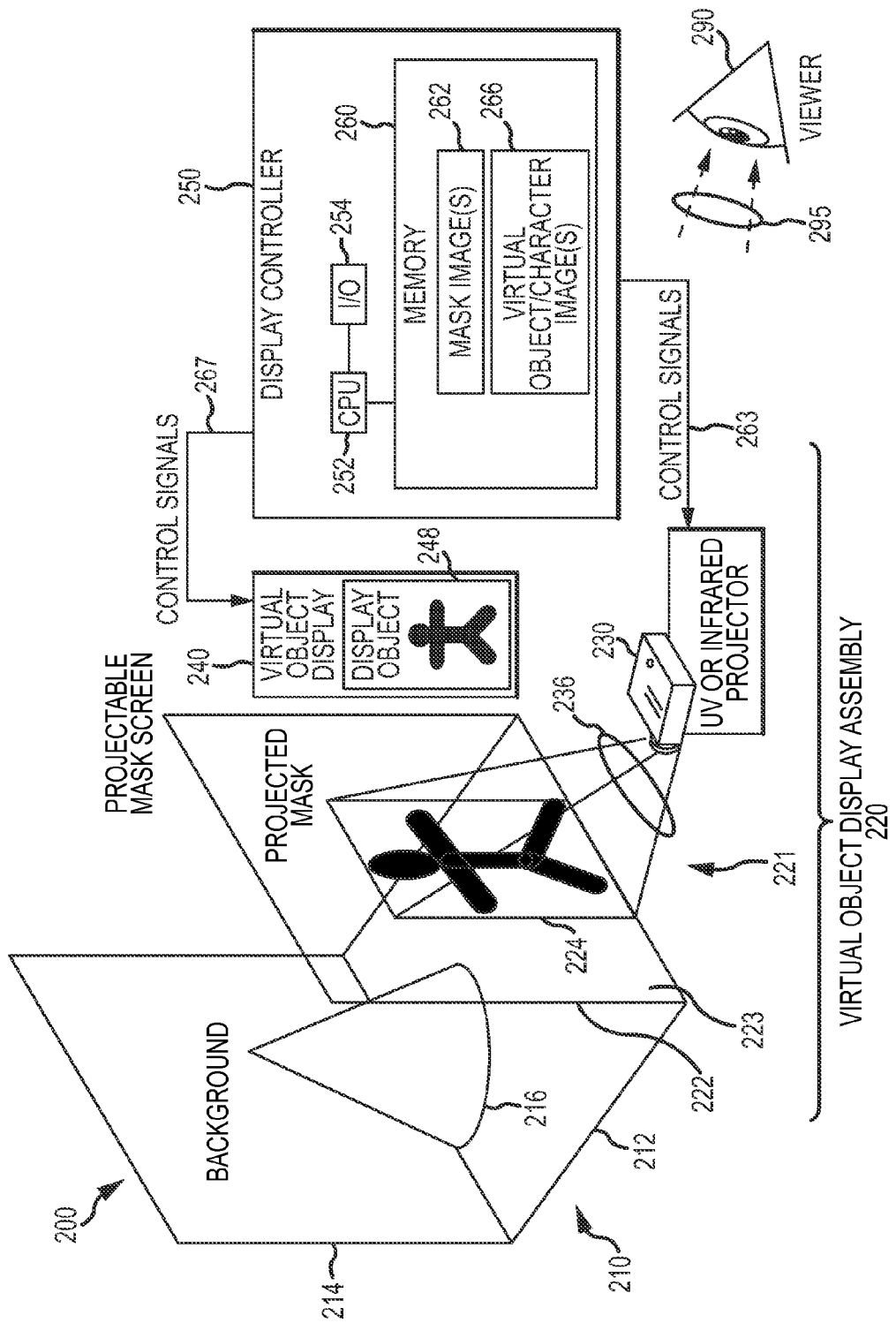
FIG. 2 is a functional block or schematic representation of a 3D display assembly or system with a mask generation screen assembly provided within the system or assembly that is used to display a virtual object (e.g., a virtual character)

FIG. 2 illustrates a 3D display system 200 that is configured for providing dynamic masks for displayed virtual objects. To this end, the system 200 is shown to include a background set or display 210 that may include a lower platform or stage 212 (e.g., a horizontal floor or shelf or the like) and a backdrop or back wall 214, and these both may be used to display imagery or be projected upon to provide background elements viewable by a viewer 290 as shown at 295 when the background set 210 is illuminated. The background set 210 may also include one or more physical objects 216 such as props or still/animated characters for a displayed virtual character (e.g., character 248) to interact with during operation of the 3D display system 200.

The 3D display system 200 also includes a virtual object display assembly 220 that is configured to selectively generate or display a virtual object 248 along with a mask 224 for that object 248 that can be viewed 295 by a viewer 290 concurrently with the background components 212, 214, 216 with these being properly occluded and shadowed. To this end, a mask generation screen assembly 221 is provided in the 3D display system 200 for providing the mask 224. In this embodiment, the assembly 221 includes a projectable mask screen 222 that is positioned between the viewer 290 (or viewing space) and the background set or display 210. In some cases, the screen 222 is sized and shaped to cover all or substantially all of the background display 210 and may be placed at or to coincide with the virtual character plane of the 3D display system 200.

A UV or IR projector 230 is provided to project UV or IR 236 onto the projectable mask screen 222 on its front surface (or surface facing outward toward the viewer 290) 223 to generate a projected mask 224. The mask 224 is generated by the screen 222 responding to the UV or IR light by turning from transparent when the mask 224 is not present to opaque (or at least to a translucent state that blocks a portion of light (e.g., 50 to 90 percent or more of the light) from the background set 210 from being provided with light 295 to the viewer 290).

The 3D display system 200 includes a virtual object display 240 that is operable to selectively display a virtual object 248, and this object 248 is typically displayed at a location between the background set 210 and the viewer 290 such as at or near the virtual character plane where the mask screen 222 is located. In the following discussion, a number of different arrangements for virtual object displays for use as display 240 are presented, and the invention is not limited to a particular technique for concurrently displaying a virtual object 248 with the mask 224.

The system 200 includes a display controller 250 that is configured to generate control signals 263, 267 to operate the projector 230 to create the projected mask 224 on screen 222 with UV or IR 236 and to also operate the virtual object display 240 to provide the displayed virtual object 248. The controller 250 may include a processor 252 that manages operation of one or more input/output devices 254 such as a keyboard, a mouse, a touchscreen/pad, a monitor with a user interface, and the like to allow an operator of the controller 250 to initiate or affect generation of the control signals 263, 267. The processor 252 may dynamically generate the mask images 262 and virtual object images 266 and store them in a buffer and/or memory (such as memory 260).

The controller 250 also manages or accesses memory (e.g., data storage or computer readable media) 260 that may store mask images 262 and virtual object images 266 used to define the projected masks 224 (size, location, and any animation) and the displayed virtual objects 248 (size, shape, location, and any animation), e.g., to match the mask 224 to the virtual object 248. The controller 250 may execute code or instructions in memory 260 to cause the controller 250 to perform certain functions (e.g., to act as a special purpose computer/device) including generating the control signals 263, 267 to operate the projector 230 and the virtual object display 240.

Figure 3:
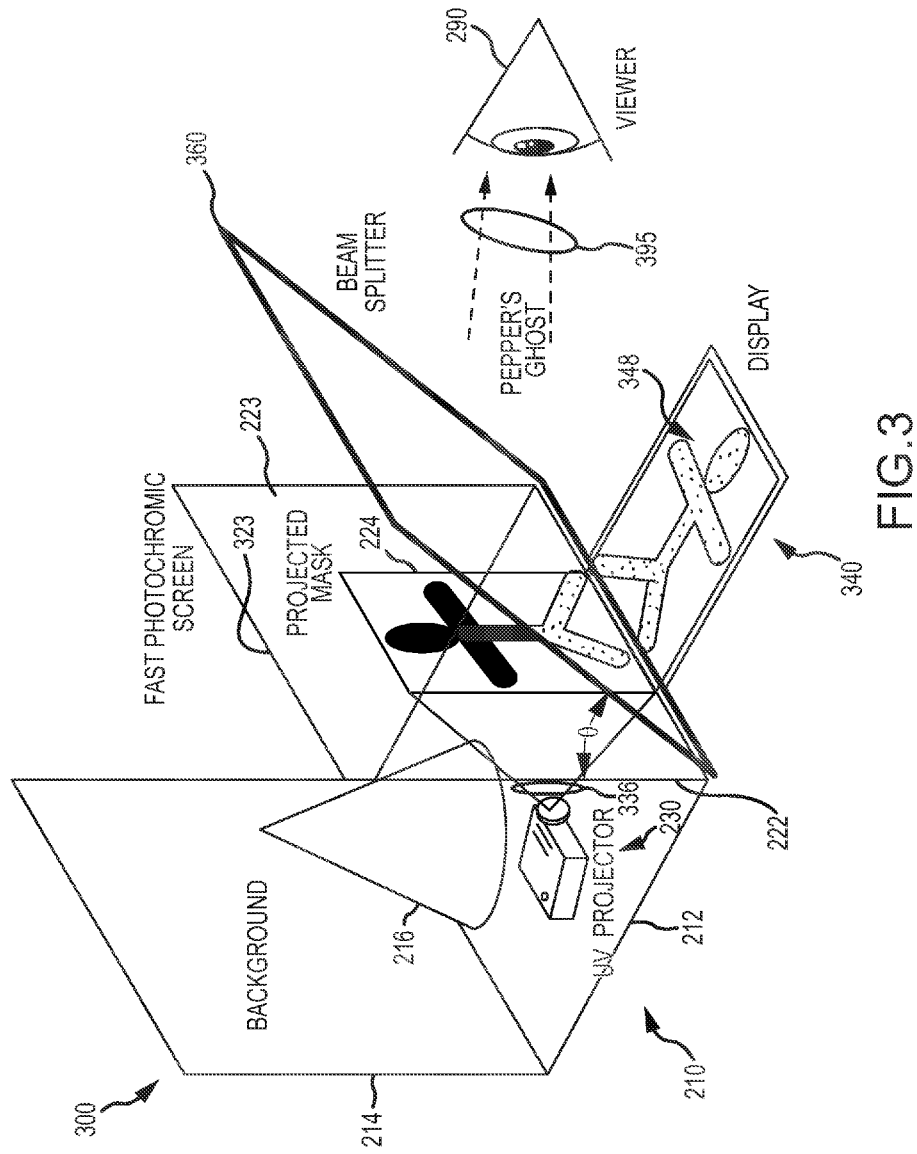
FIG. 3 is a functional block or schematic drawing of a 3D display system similar to that of FIG. 2 showing a particular implementation to provide a projectable mask.

At this point, it may be useful to describe a specific arrangement of components that may be used to implement a 3D display system or Pepper's Ghost display system such as that of system 200 of FIG. 2. Particularly, FIG. 3 shows a 3D display system 300 that provides a projected mask 224 upon operation of a UV projector 230 to project UV 336. The UV 336 strikes, in this case, the back side 323 of the screen 222 and presents a mask 224 viewable on the front surface 223 of the screen 222 by turning select portions from transparent to opaque. The system 300 includes a number of components from system 200, and these are numbered as in FIG. 2. The projector 230 is positioned in or near the background set or display 210 to project onto the back surface 323 rather than the front surface 223 as shown in FIG. 2.

The projectable mask screen 222 may take the form of or use fast photochromic material(s) such as those produced by Dr. Jiro Abe, Professor at Aoyama Gakuin University and/or available from other producers/sources. The screen 222 is normally transparent such as when the projector 230 is not projecting the UV light 336 onto surface 323. The screen 222 becomes opaque (or nearly so) where exposed to UV light 336 such as where it is desired to provide the projected mask 224. With some types of fast photochromic material, the screen 222 is opaque to visible light (e.g., light from the background 210 or foreground where viewer 290 is located) where exposed to UV light 336 within about 30 milliseconds and then reverts back to being transparent within about 30 milliseconds when the UV light 336 is removed by operation of the UV projector 230.

In some cases, the UV light source or projector 230 takes the form of a UV scanned laser (e.g., UV laser operating to provide X-Y scanner) that is operated with control signals from a display controller to project the mask image 224 onto the screen 222. The display system 300 includes a display device 340 that is operable (e.g., via control signals from a display controller) to display a virtual object image 348. The display device 340 may be an LCD or other device that is positioned relative to a beamsplitter 360 (which may be provided at an angle, θ, relative to the front surface 223 of the screen 222 such as at 45 degrees) to provide the virtual object image 348 in a virtual character plane coinciding with the screen surface 223.

Figure 1:
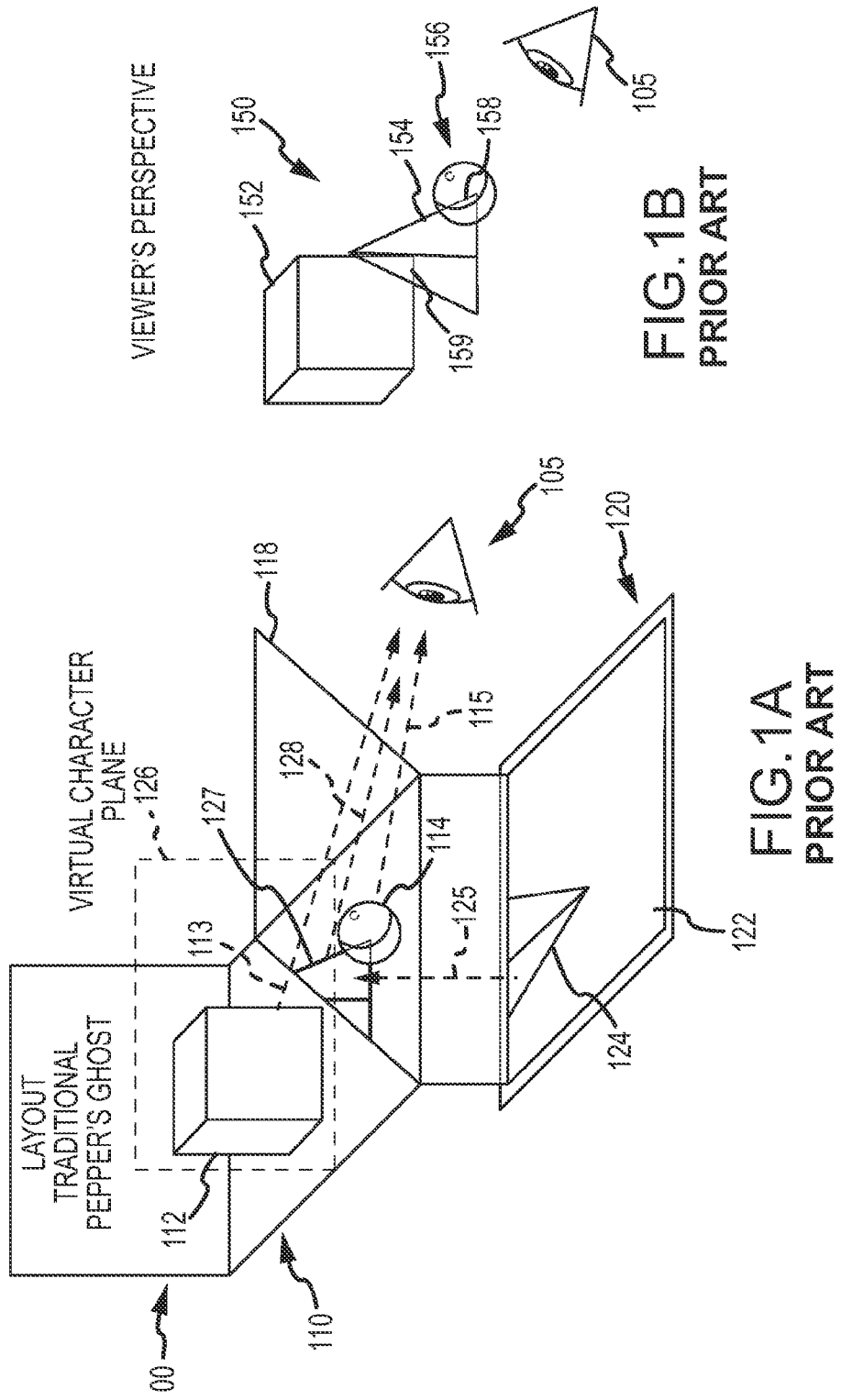
FIGS. 1A and 1B illustrate a traditional Pepper's Ghost display assembly and a viewer's perspective (or the resulting displayed imagery) of the display assembly output, respectively.

In this way, the display system 300 is operable to overlay a virtual character/object 348 onto this background mask 224 using the beamsplitter 360 and the display 340 (as was the case with prior Pepper's Ghost display assemblies as shown in FIGS. 1A and 1B). The viewer 290 then observes Pepper's Ghost as shown at 395 by concurrently seeing a reflection of the displayed virtual object 348 from a front surface of the beamsplitter 360 and by viewing the background set 210 (which is illuminated) through the transparent portions of the screen 222 and the opaque mask 224.

Figure 4:
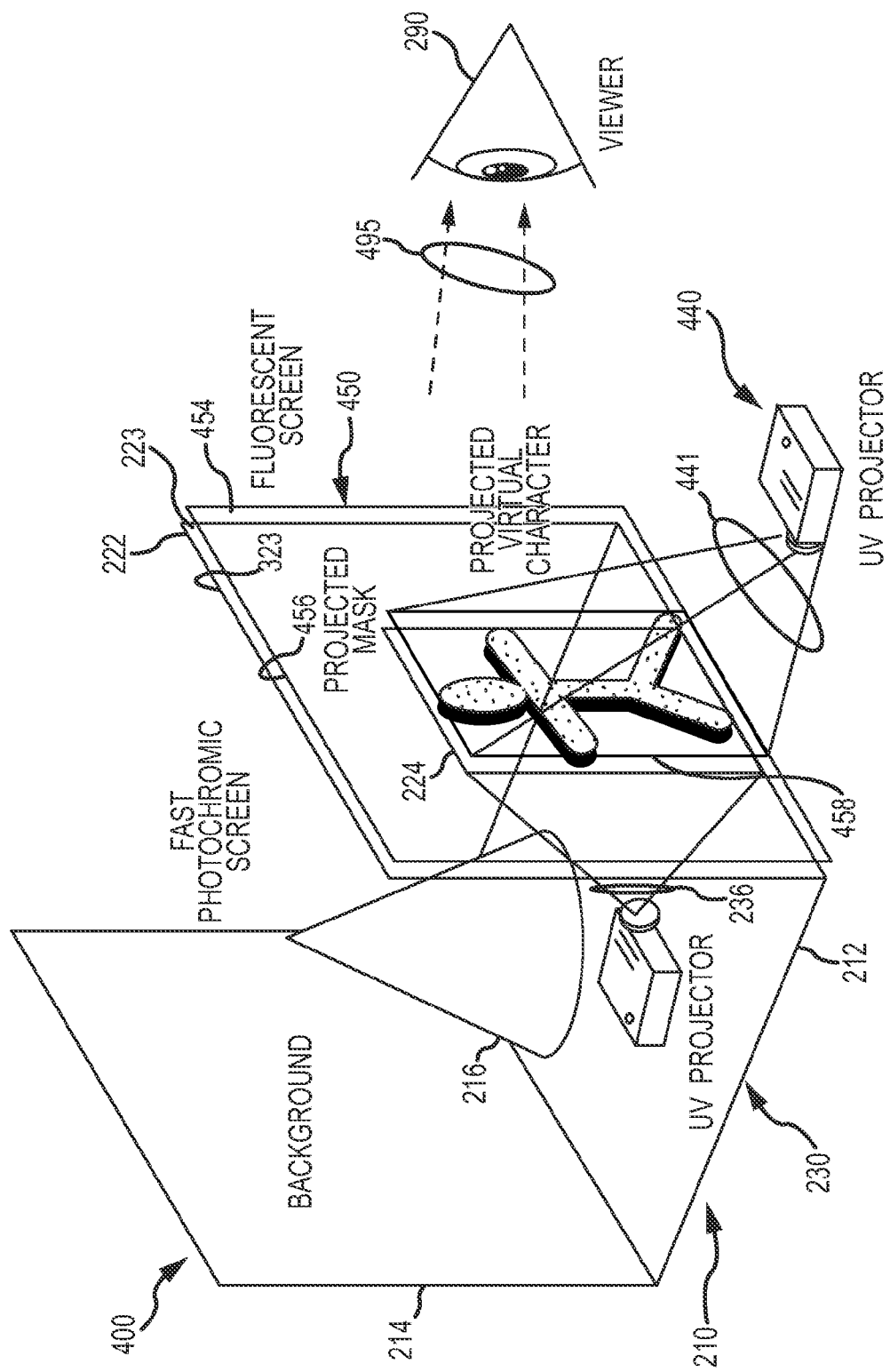
FIG. 4 is a functional block or schematic illustration of a 3D display system similar to that shown in FIG. 3 showing use of a transparent fluorescent screen and UV projector as the virtual object display portion of the system.

FIG. 4 illustrates another 3D display system 400 that is configured to replace the beamsplitter 360 and provide the virtual object display with a UV projector 440 and a transparent fluorescent screen 450. More specifically, instead of using a beamsplitter, the system 400 includes a transparent fluorescent screen 450 with a first or front surface 454 facing the viewing area and viewer 290 and a second or back surface 456 facing the background set 210. The screen 450 may be positioned so that the surfaces 454, 456 are parallel to (or substantially so) the fast photochromic screen 222, and the back surface 456 may be contacting the front surface 223 of the fast photochromic screen 222 or be spaced apart some distance (e.g., up to 1 or more inches). A UV projector 440 is provided that projects UV light 441 onto the surface 454 of the transparent fluorescent screen 450 to provide the projected virtual character 458, which is visible to the viewer 290 as shown at 495 with light passing through the transparent portions of the fast photochromic screen 222 from the background set 210.

In practice, the transparent fluorescent screen 450 is selected such that it glows when UV 441 is projected onto it by projector 440, and the screen 450 can be placed in front of the screen 222 used to provide the projected masks 224 (e.g., between the viewer 290 and the background set 210). The UV projector or scanner 230 is operated (e.g., by a controller not shown in FIG. 4) to project 236 the mask 224 from behind onto the fast photochromic material 222 while concurrently another UV projector or scanner 440 is operated to project 441 the visible virtual character 458 from the front onto the transparent fluorescent screen 450. None of the UV light 441 passes through the transparent fluorescent screen 450 onto the fast photochromic material of screen 222.

From the front as seen by the viewer 290 as shown at 495, the transparent fluorescent screen 450 displays a visible virtual character 458 while the fast photochromic material provides a matching mask 224 of the virtual character 458 against the background 210. The virtual character 458, thus, would appear via light 495 in color, with high contrast, and as being opaque in front of the background components 212, 214, 216. In other cases, the system 400 is modified to replace the transparent fluorescent screen 450 with an IR-activated screen and to replace the UV projector 440 with an IR projector/scanner. Further, a color scattered layer may be provided as part of the virtual object display assembly by further including an RGB projector projecting onto the surface 454 along with the projector 440 (UV/IR projector or scanner).

Figure 5:
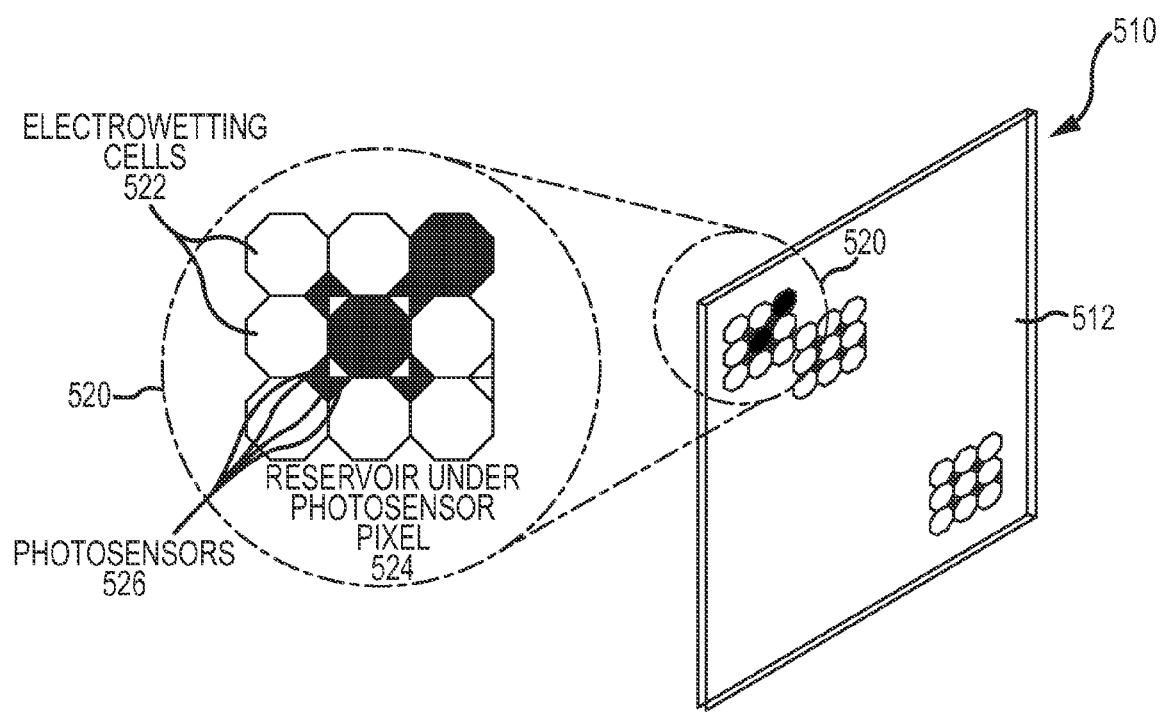
FIG. 5 illustrates an optically addressed electrowetting display that may be used as the screen within a mask generation screen assembly in one of the 3D display systems described herein.

In other embodiments of the 3D display system, the screen portion of the mask generation screen assembly (such as assembly 221 of FIG. 2) may take the form of an optically addressed electrowetting display 510 as shown in FIG. 5. The display 510 includes a front or display surface 512 that would be positioned in a 3D display system to face toward the viewer or viewing space, and the surface 512 may coincide with or be directly behind/adjacent to the virtual character plane (as shown in FIG. 3) or a display/screen used to display the virtual object (as shown in FIG. 4). The surface 512 of the electrowetting screen 510 generates the virtual object (not shown in FIG. 5) through the use and operation of an assembly 520 of pixel cells 522. As shown, photosensors 526 are interdigitated between the display's pixels/cells 522 and a reservoir 524 is provided under the photosensored pixels 522.

Figures 6A, 6B:
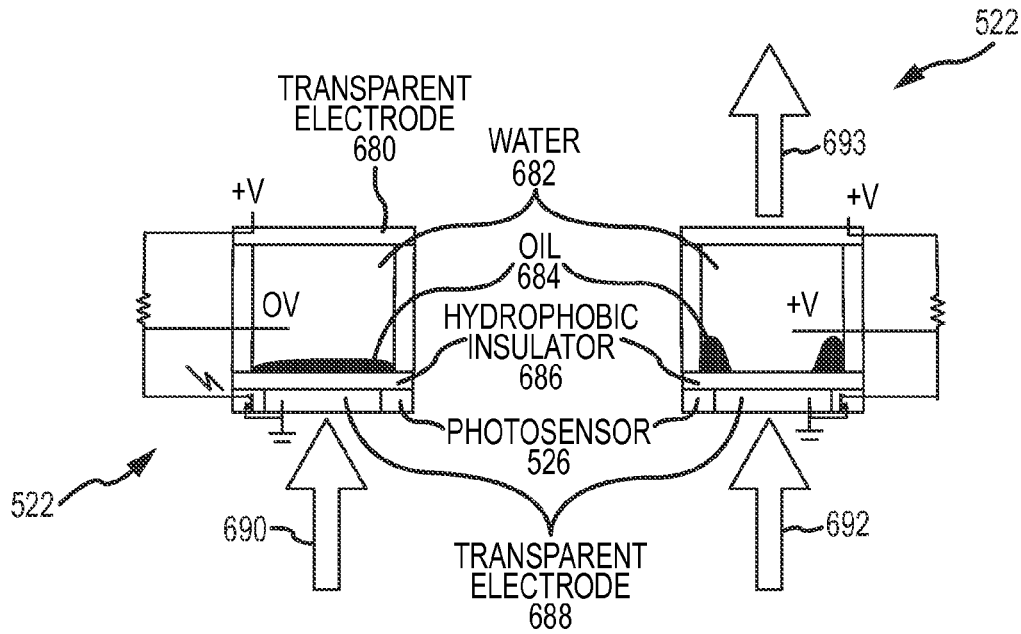
FIGS. 6A-6C illustrate side views of exemplary electrowetting cells as may be included in the display of FIG. 5 as they may appear during operation of the display to provide a dynamic mask.
Figure 6C:
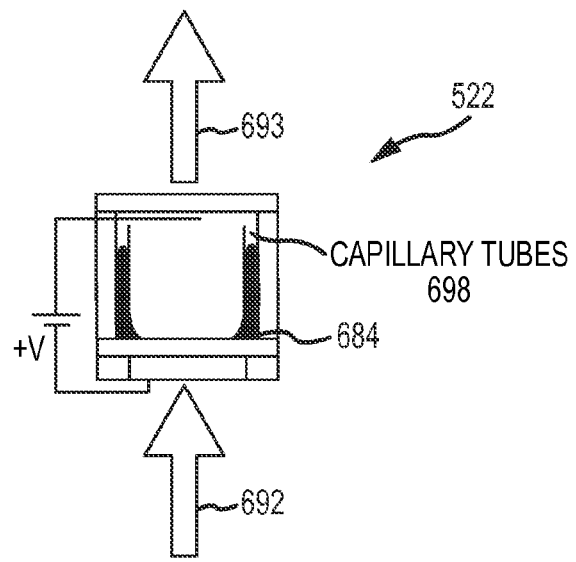

FIGS. 6A-6C provide side views of one of the cells 522 of the display 510 showing the structure and operation of such optically addressed electrowetting cells. As shown, each cell 522 includes on first and second surfaces transparent electrodes 680 and 688. Photosensors 526 are provided about the electrode 688 and are used to sense infrared light 690, and, in response, as shown, the cell 522 operates such that the pixel is opaque. The cell 522 further includes a hydrophobic insulator 686, and the cell 522 contains a volume of water 682 and a volume of oil 684. As shown in FIGS. 6B and 6C, when the photosensors 526 do not detect infrared light 692, the cell 522 functions to make the pixel transparent and pass the visible light 693 through the cell 522. As shown in FIG. 6C, capillary tubes 698 are included in the cell 522 behind the photosensor 526 to store the oil 684 when the pixel is transparent.

As shown and should be understood, an electrowetting screen or display 510 has hydrophobic pixel cells 522 filled with opaque oil drops 684 and water 682. When a voltage is applied to the pixel 522 in response to not sensing of IR light as shown in FIG. 6B, the opaque oil drops 684 are balled up near the walls of the well, which allows visible light 692, 693 from the background scene or set to pass through with very low light loss. Often, the pixel 522 as shown in FIG. 6B will be up to about 70 percent transparent. In contrast as shown in FIG. 6A, without an applied voltage, the oil 684 covers the bottom of the well blocking the background light, and the pixel 522 is opaque.

Rather than using electronic matrix addressing of the pixels, optical direct addressing may be used with a photosensor 526 located near each pixel 522. For example, the pixels 522 may be octagonal, with square segmented photosensors 526 in the corners between the octagons as shown in FIG. 5. The photosensor 526 may be tuned (e.g., using filters) to a particular wavelength of light (e.g., infrared) so when it detects that wavelength of light it turns the pixel opaque as shown in FIG. 6A. In the absence of that tuned/selected wavelength striking the photosensor 526, it turns the pixel 522 transparent as shown in FIGS. 6B and 6C. The photosensor electronics may also be designed to detect coded light (rather than continuous IR light) to turn the pixel on and off.

As the photosensors 526 are likely opaque, the oil 684 may be stored, as shown in FIG. 6C, behind the photosensors 526 when the pixel is transparent. For example, capillary tubes 698 may be provided in the cell/pixel 522 to draw the oil 684 into thin tubes rather than into balls as shown in the embodiment of FIG. 6B when the pixel/cell 522 is transparent. Such an arrangement would ensure maximum, or at least enhance, transparency of the cell 522 when no IR light is sensed. If the projectable mask screen assembly 510 is tuned to detect IR, a separate transparent fluorescent screen may be used to display an image when UV light is projected onto it (as discussed above). The combination of these two screens/displays would provide a glowing virtual character with an opaque mask to block light from the background or from passing through from behind. Although there have been electrowetting displays before, here photosensors are interdigitated to switch the electrowetting cell from transparent to opaque (or vice versa), and the optically addressed electrowetting screen is then used as a mask to be used in conjunction with a reflected, scattered, or emissive color image.

Figure 7A:
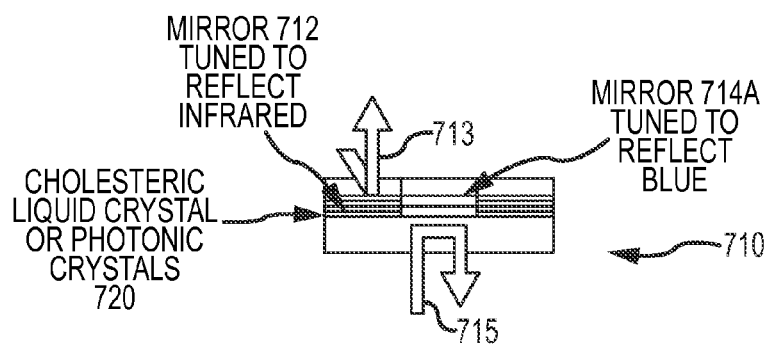
FIGS. 7A-7C illustrate a tunable mirror mask (or mask generation display screen using tunable mirrors) with a three-layered mirror to reflect red, green, and blue light with a mirror tuned to be opaque (e.g., to provide a portion of a generated mask for a virtual object image or projected virtual object/character).
Figure 7B:
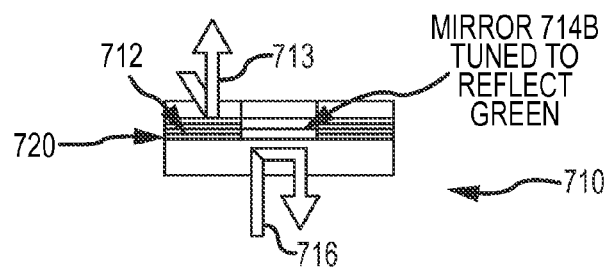
Figure 7C:
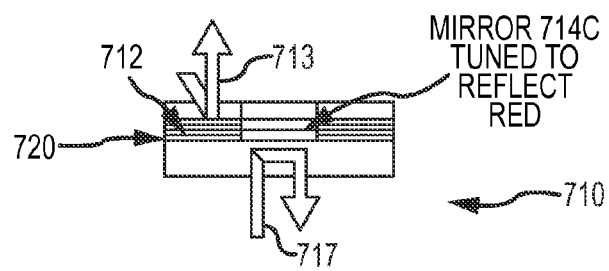

Another type of screen that may be used in a mask generation screen assembly (such as assembly 221 in FIG. 2 for screen 222) is a tunable mirror screen that is optically addressed. FIGS. 7A-7C illustrate a portion of a tunable mirror mask 710 that may be used for the mask generation screens of the present invention. The mask 710 is shown to include tunable mirrors 712, 714 (e g , thin film Bragg reflectors such as those distributed by Mirasol® or other distributors). In one embodiment, the mirrors 712, 714 are made up of dielectric mirrors made from thin film interference stacks including cholesterol liquid crystals 720 that are tuned to reflect specific wavelengths of light and pass all others. The application of an electric signal changes the wavelength that is reflected by each mirror 712, 714, which can be changed from infrared 713, as shown for mirror 712, through visible to ultraviolet, as shown with mirror 714. Normally, these tunable mirrors 712, 714 are tuned to reflect a very narrow range of wavelengths from very narrow incident ranges. However, it is possible to tune the mirrors 712, 714 of the screen 710 to reflect a narrow range of wavelengths over a broader range of incident angles.

A mask 710 can be created using tunable mirrors 712, 714 and illuminating the background in specific wavelengths of light. The display 710 may be provided as three layers of tunable mirrors. The background may then be illuminated in narrowband red, green, and blue. When portions of the mask 710 are transparent as shown with mirror 712, the tunable mirror layers may be tuned to reflect infrared, while red, green, or blue visible light may pass through. When portions of the mask 710 are opaque as shown with mirror 714, one layer 714C may be tuned to reflect red 717 (and pass green and blue), the next layer 714B may be tuned to reflect green 716 (and pass blue), and the last layer 714C may be tuned to reflect blue 715. Thus, no visible light from the background set behind the mirror 714 (and similarly configured tunable mirrors of mask 710) passes through, and a mask is generated that appears opaque/black from the front side/surface of the display or mask generation device 710. This may be done sequentially, with background light being rapidly switched between red, green, and blue illumination, and a single set of layers may be tuned in synchrony to reflect infrared (for transparent) or tuned to reflect the current illumination color (for opaque).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In some embodiments, the mask is provided using optical addressing. This allows the mask to be scalable. Only the portion of the screen that requires the mask needs to be stored and projected, which significantly reduces computation and electronics required to display a large sized (e.g., room sized) mask. The projected mask can be optically translated or rotated.

The mask screen and light sensing may be pixellated or pixel-free. The mask may locally and selectively change from transparent to opaque (or vice versa) using projected light via photochemical, a combination of photoelectric to electrochemical, a combination of photoelectric to electro-optic, or a combination of photoelectric to electro-mechanical to mechano-optical processes. The optically addressed mask screen may be used with single, tiled, scanned, or optically addressed semi-transparent images or displays to create opaque high contrast virtual characters.

These masks may be combined with (optically addressed) self-emissive, transparent fluorescent or selectively scattering layers to combine a unified projection and mask screen and a single projector or multiple (visible and UV or IR) projectors. Matching color images may come from Pepper's Ghost reflections of displays or from separate projections onto a scrim, a switchable scattering screen, or a transparent fluorescent screen. A single projector (with RGB color and UV or IR images) may use the same UV/1R image to locally change the screen from transparent to a matching absorbing opaque back layer (for blocking the background) and a locally switchable scattering foreground layer (for accepting, the color projection from the same projector). Alternatively, a single projector (UV or IR) may project images to locally change the screen from transparent to a matching absorbing opaque back layer (for blocking the background). A scattering foreground layer may be used to accept light from a separate color projection. Alternatively, multiple projectors may be used such as a UV or IR projector to control the mask, a UV or IR projector to control the scattering layer, and a color projector to project the visible color virtual character.

I claim:

1. A virtual object display assembly for use with a background set with background objects, comprising:
   a virtual object display operable to selectively display a virtual object image at a virtual object plane; and
   a mask generation screen assembly with a screen element, wherein the mask generation screen assembly is operable in a first state in which the screen element is transparent to visible light and is operable in a second state in which a portion of the screen element is substantially opaque to visible light and
   wherein the screen element comprises a projectable mask screen adapted to be opaque in regions exposed to a predefined type of non-visible light.

2. The display assembly of claim 1, wherein the screen element is positioned proximate to the virtual object plane and wherein the opaque portion corresponds in size, shape, and location to the displayed virtual object image, whereby the opaque portion provides a mask for the displayed virtual object image.

3. The display assembly of claim 1, wherein the predefined type of non-visible light is ultraviolet (UV) light or infrared (IR) light.

4. The display assembly of claim 3, wherein the mask generation screen assembly includes a UV projector when the predefined type of non-visible light is UV light and includes an IR projector when the predefined type of non-visible light is IR light.

5. The display assembly of claim 1, wherein the projectable mask screen comprises a fast photochromic screen.

6. The display assembly of claim 1, wherein the virtual object display comprises a display screen positioned transverse to the projectable mask screen and operable to display the virtual object image and a beamsplitter disposed at an angle between the display screen and the projectable mask screen.

7. The display assembly of claim 1, wherein the virtual object display comprises a transparent fluorescent screen positioned adjacent and parallel to the projectable mask screen and further comprises a UV projector selectively projecting the predefined type of non-visible light onto the transparent fluorescent screen to provide the displayed virtual object image.

8. A virtual object display assembly for use with a background set with background objects, comprising:
a virtual object display operable to selectively display a virtual object image at a virtual object plane; and
a mask generation screen assembly with a screen element, wherein the mask generation screen assembly is operable in a first state in which the screen element is transparent to visible light and is operable in a second state in which a portion of the screen element is substantially opaque to visible light and
wherein the screen element of the mask generation screen assembly comprises an electrowetting display with optically addressed cells, the optically addressed cells being operated to be transparent in the first operating state and a subset of the optically addressed cells being operated to be opaque in the second operating state.

9. The display assembly of claim 8, wherein the screen element is positioned proximate to the virtual object plane and wherein the opaque portion corresponds in size, shape, and location to the displayed virtual object image, whereby the opaque portion provides a mask for the displayed virtual object image.

10. A virtual object display assembly for use with a background set with background objects, comprising:
a virtual object display operable to selectively display a virtual object image at a virtual object plane; and
a mask generation screen assembly with a screen element, wherein the mask generation screen assembly is operable in a first state in which the screen element is transparent to visible light and is operable in a second state in which a portion of the screen element is substantially opaque to visible light and
wherein the screen element of the mask generation screen assembly comprises a tunable mirror device comprising a plurality of tunable mirror stacks adapted to operate in the first and second operating states to provide a mask for the displayed virtual object image.

11. The display assembly of claim 10, wherein the screen element is positioned proximate to the virtual object plane and wherein the opaque portion corresponds in size, shape, and location to the displayed virtual object image, whereby the opaque portion provides a mask for the displayed virtual object image.

12. A 3D display apparatus; comprising:
a background set with physical objects;
a virtual object display operable to display an image of an object in a virtual object plane;
a projectable mask screen disposed proximate to the virtual object plane;
a projector operable to project non-visible light onto the projectable mask screen to turn a portion of the projectable mask screen from transparent to opaque; and
a display controller concurrently operating the virtual object display to provide the displayed object image and the projector to project the non-visible light, wherein the opaque portion of the projectable mask screen blocks visible light reflected from the physical objects from passing through the projectable mask screen in regions aligned with the displayed object image in the virtual object plane.

13. The apparatus of claim 12, wherein the projector comprises a UV projector.

14. The apparatus of claim 13, wherein the projectable mask screen comprises a fast photochromic screen.

15. The apparatus of claim 14, wherein the virtual object display either comprises a display element operable to display the image of the object and a beamsplitter positioned between the display element and the fast photochromic screen or comprises a transparent fluorescent screen adjacent the fast photochromic screen and a second UV projector projecting the image of the object onto the transparent fluorescent screen.

16. The apparatus of claim 12, wherein the projector comprises an IR projector or scanner and the projectable mask screen comprises an IR activated screen.

17. A virtual object display assembly, comprising:
a virtual object display operable to selectively display a semi-transparent image of an object; and
a mask generation screen assembly with a screen element that is optically addressable for selectively providing a mask that is substantially opaque to visible light at a location and with a size corresponding with the semi-transparent image; and
further comprising a projector with a UV or IR channel for use in switching between display of the mask and display of the semi-transparent image with a scattering screen, wherein the projector further comprises RGB color channels for use in projecting the semi-transparent image as a color image projection.

18. The display assembly of claim 17, wherein the mask comprises a pixel or pixel-free mask.

19. The display assembly of claim 17, wherein the screen element provides the mask using photochemical processes, a combination of photoelectric to electrochemical processes, a combination of photoelectric to electro-optic processes, or a combination of photoelectric to electro-mechanical to mechano-optical processes.

20. The display assembly of claim 17, wherein the screen element comprises a mask back layer of a multilayer screen and the virtual object display comprises an optically addressed locally selective scattering layer of the multilayer screen.

* * * * *

UNITED STATES PATENT AND TRADEMARK OFFICE
CERTIFICATE OF CORRECTION

| | | |
|---|---|---|
| PATENT NO. | : 9,132,361 B2 | Page 1 of 1 |
| APPLICATION NO. | : 13/889077 | |
| DATED | : September 15, 2015 | |
| INVENTOR(S) | : Quinn Y. Smithwick | |

It is certified that error appears in the above-identified patent and that said Letters Patent is hereby corrected as shown below:

In the claims,

Column 13, line 38, delete "opague" and insert therefor --opaque--.

Signed and Sealed this
Ninth Day of February, 2016

Michelle K. Lee
*Director of the United States Patent and Trademark Office*